United States Patent
Lee

(10) Patent No.: US 11,468,247 B2
(45) Date of Patent: Oct. 11, 2022

(54) ARTIFICIAL INTELLIGENCE APPARATUS FOR LEARNING NATURAL LANGUAGE UNDERSTANDING MODELS

(71) Applicant: LG ELECTRONICS INC., Seoul (KR)

(72) Inventor: Jaehwan Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 312 days.

(21) Appl. No.: 16/742,756

(22) Filed: Jan. 14, 2020

(65) Prior Publication Data

US 2021/0165974 A1     Jun. 3, 2021

(30) Foreign Application Priority Data

Nov. 28, 2019  (KR) .................. 10-2019-0155419

(51) Int. Cl.
*G06F 40/58* (2020.01)
*G06N 20/00* (2019.01)
*G06F 40/47* (2020.01)

(52) U.S. Cl.
CPC .............. *G06F 40/58* (2020.01); *G06F 40/47* (2020.01); *G06N 20/00* (2019.01)

(58) Field of Classification Search
None
See application file for complete search history.

(56) References Cited

U.S. PATENT DOCUMENTS

| | | | |
|---|---|---|---|
| 10,747,962 B1 * | 8/2020 | Fuerstenau | G06F 40/55 |
| 2014/0095143 A1 * | 4/2014 | Jan | G06F 40/163 704/2 |
| 2020/0210523 A1 * | 7/2020 | Aghajanyan | G06N 20/00 |
| 2020/0401899 A1 * | 12/2020 | Dohan | G06N 3/0481 |

* cited by examiner

*Primary Examiner* — Antim G Shah
(74) *Attorney, Agent, or Firm* — Lee, Hong, Degerman, Kang & Waimey PC

(57) ABSTRACT

The present disclosure provides an artificial intelligence apparatus which inputs first language data into a machine translation model to economically train a natural language understanding model of a second language and obtains second language data corresponding to the first language data to train the natural language understanding model.

8 Claims, 8 Drawing Sheets

ARTIFICIAL INTELLIGENCE APPARATUS FOR LEARNING NATURAL LANGUAGE UNDERSTANDING MODELS

CROSS-REFERENCE TO RELATED APPLICATIONS

Pursuant to 35 U.S.C. § 119(a), this application claims the benefit of earlier filing date and right of priority to Korean Patent Application No. 10-2019-0155419, filed on Nov. 28, 2019, the contents of which are hereby incorporated by reference herein in its entirety.

BACKGROUND

The present disclosure is for learning a natural language understanding model for obtaining a parallel corpus of a first language and a second language using a machine translation model and performing a command corresponding to a second language data.

The intent of natural language understanding is to allow a machine to be capable of understanding even if the expression used as usual by a person is provided as it is, not the language of the machine.

The recent development in deep learning technology has made it possible to solve the limitations of traditional statistics and a rule-based natural language understanding (NLU) technique or a machine learning method of natural language understanding (NLU) technique. In detail, as the deep learning technology is developed, a feature can be automatically learned from natural language understanding data, thereby enabling a wider range of information processing than before. For example, words or morphemes can be vectorized through word embedding technology, and then sentences can be classified into corresponding categories using the NLU.

Meanwhile, in conforming with globalization trends, countries that use other languages should be able to also support high-quality natural language understanding function.

In order to build a natural language understanding model, manual learning is required. If different languages from each other are used, there is a problem in that the natural language understanding model should be learned by collecting corpus for each language and manually labeling an operation corresponding to the corpus as a result value.

SUMMARY

An object of the present disclosure relates to an artificial intelligence apparatus and a method for economically learning a natural language understanding model of a second language using a machine translation model if a natural language understanding model of a second language different from the first language is learned.

An artificial intelligence apparatus according to the present disclosure is to provide one or more processors configured to input a first corpus of first language data into a machine translation model to obtain a second corpus of second language data, and use the obtained second corpus and a command corresponding to the first corpus of the first language data to learn a natural language understanding model.

DETAILED DESCRIPTION OF THE EMBODIMENTS

Figure 1:
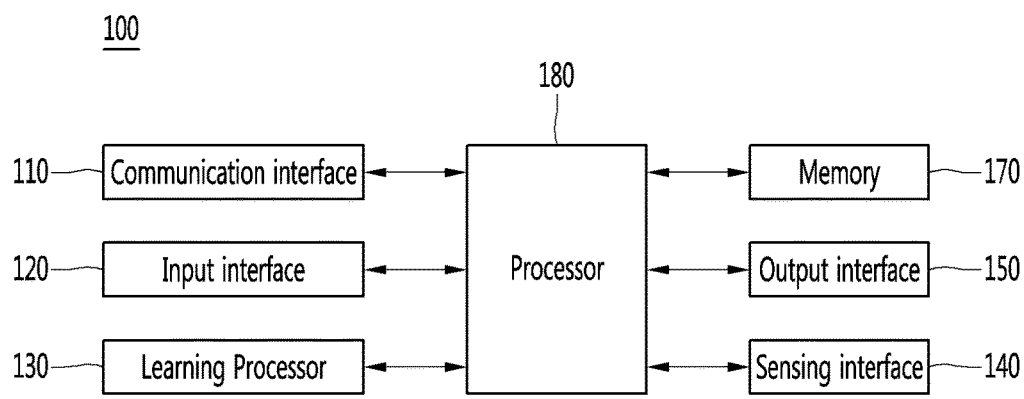
FIG. 1 is a block diagram illustrating an AI apparatus according to an embodiment of the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "interface" for components used in the description below are assigned or mixed in consideration of easiness in writing the specification and do not have distinctive meanings or roles by themselves. In the following description, detailed descriptions of well-known functions or constructions will be omitted since they would obscure the disclosure in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers.

Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving interface may include an actuator or a motor and may perform various physical operations such as moving a robot joint. In addition, a movable robot may include a wheel, a brake, a propeller, and the like in a driving interface, and may travel on the ground through the driving interface or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

Here, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 is a block diagram illustrating an AI apparatus 100 according to an embodiment of the present disclosure.

Hereinafter, the AI apparatus 100 may be referred to as a terminal.

The AI apparatus (or an AI device) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI apparatus 100 may include a communication interface 110, an input interface 120, a learning processor 130, a sensing interface 140, an output interface 150, a memory 170, and a processor 180.

The communication interface 110 may transmit and receive data to and from external devices such as other 100a to 100e and the AI server 200 by using wire/wireless communication technology. For example, the communication interface 110 may transmit and receive sensor information, a user input, a learning model, and a control signal to and from external devices.

The communication technology used by the communication interface 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™ RFID (Radio Frequency Identification), Infrared Data Association (IrDA), ZigBee, NFC (Near Field Communication), and the like.

The input interface 120 may acquire various kinds of data.

Here, the input interface 120 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 120 may acquire a learning data for model learning and an input data to be used when an output is acquired by using learning model. The input interface 120 may acquire raw input data. Here, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

Here, the learning processor 130 may perform AI processing together with the learning processor 240 of the AI server 200.

Here, the learning processor 130 may include a memory integrated or implemented in the AI apparatus 100. Alternatively, the learning processor 130 may be implemented by using the memory 170, an external memory directly connected to the AI apparatus 100, or a memory held in an external device.

The sensing interface 140 may acquire at least one of internal information about the AI apparatus 100, ambient environment information about the AI apparatus 100, and user information by using various sensors.

Examples of the sensors included in the sensing interface 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 150 may generate an output related to a visual sense, an auditory sense, or a haptic sense.

Here, the output interface 150 may include a display interface for outputting time information, a speaker for outputting auditory information, and a haptic module for outputting haptic information.

The memory 170 may store data that supports various functions of the AI apparatus 100. For example, the memory 170 may store input data acquired by the input interface 120, learning data, a learning model, a learning history, and the like.

The processor 180 may determine at least one executable operation of the AI apparatus 100 based on information determined or generated by using a data analysis algorithm or a machine learning algorithm. The processor 180 may control the components of the AI apparatus 100 to execute the determined operation.

To this end, the processor 180 may request, search, receive, or utilize data of the learning processor 130 or the memory 170. The processor 180 may control the components of the AI apparatus 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for obtaining intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI apparatus 100 so as to drive an application program stored in memory 170. Furthermore, the processor 180 may operate two or more of the components included in the AI apparatus 100 in combination so as to drive the application program.

Figure 2:
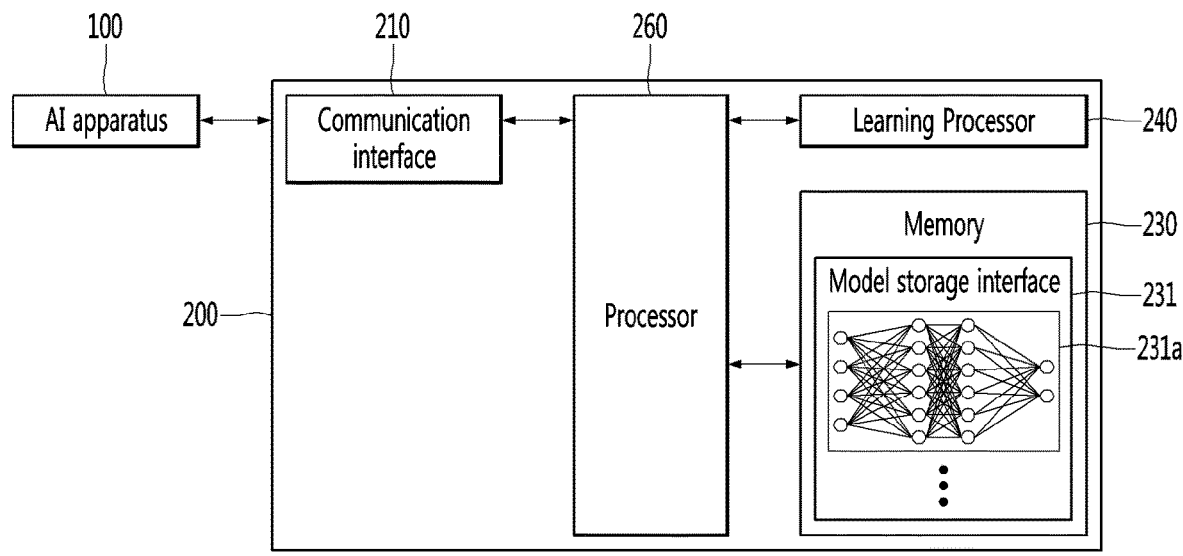
FIG. 2 is a block diagram illustrating an AI server according to an embodiment of the present disclosure.

FIG. 2 is a block diagram illustrating an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. Here, the AI server 200 may be included as a partial configuration of the AI apparatus 100, and may perform at least part of the AI processing together.

The AI server 200 may include a communication interface 210, a memory 230, a learning processor 240, a processor 260, and the like.

The communication interface 210 can transmit and receive data to and from an external device such as the AI apparatus 100.

The memory 230 may include a model storage interface 231. The model storage interface 231 may store a learning or learned model (or an artificial neural network 231*a*) through the learning processor 240.

The learning processor 240 may learn the artificial neural network 231*a* by using the learning data. The learning model may be used in a state of being mounted on the AI server 200 of the artificial neural network, or may be used in a state of being mounted on an external device such as the AI apparatus 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
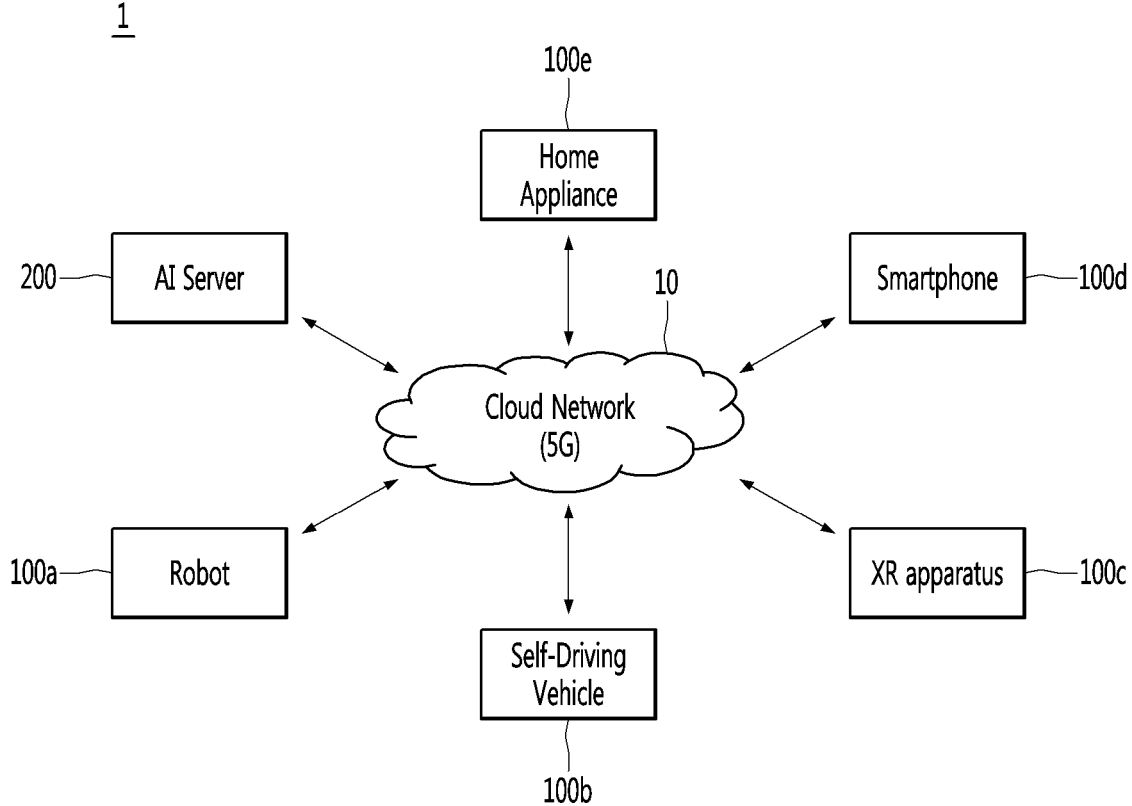
FIG. 3 is a view illustrating an AI system according to an embodiment of the present disclosure.

FIG. 3 is a view illustrating an AI system 1 according to an embodiment of the present disclosure.

Referring to FIG. 3, in the AI system 1, at least one of an AI server 200, a robot 100*a*, a self-driving vehicle 100*b*, an XR device 100*c*, a smartphone 100*d*, or a home appliance 100*e* is connected to a cloud network 10. The robot 100*a*, the self-driving vehicle 100*b*, the XR device 100*c*, the smartphone 100*d*, or the home appliance 100*e*, to which the AI technology is applied, may be referred to as AI apparatuses 100*a* to 100*e*.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI apparatuses constituting the AI system 1, that is, the robot 100a, the self-driving vehicle 100b, the XR device 100c, the smartphone 100d, or the home appliance 100e through the cloud network 10, and may assist at least part of AI processing of the connected AI apparatuses 100a to 100e.

Here, the AI server 200 may learn the artificial neural network according to the machine learning algorithm instead of the AI apparatuses 100a to 100e, and may directly store the learning model or transmit the learning model to the AI apparatuses 100a to 100e.

Here, the AI server 200 may receive input data from the AI apparatuses 100a to 100e, may infer the result value for the received input data by using the learning model, may generate a response or a control command based on the inferred result value, and may transmit the response or the control command to the AI apparatuses 100a to 100e.

Alternatively, the AI apparatuses 100a to 100e may infer the result value for the input data by directly using the learning model, and may generate the response or the control command based on the inference result.

Hereinafter, various embodiments of the AI apparatuses 100a to 100e to which the above-described technology is applied will be described. The AI apparatuses 100a to 100e illustrated in FIG. 3 may be regarded as a specific embodiment of the AI apparatus 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

Here, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external device to determine the travel route and the travel plan, and may control the driving interface such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving interface based on the control/interaction of the user. Here, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling route by using the recognized surrounding information or object information. The learning model may be learned directly from the self-driving vehicle 100a or may be learned from an external device such as the AI server 200.

Here, the self-driving vehicle 100b may perform the operation by generating the result by directly using the learning model, but the sensor information may be transmitted to the external device such as the AI server 200 and the generated result may be received to perform the operation.

The self-driving vehicle 100*b* may use at least one of the map data, the object information detected from the sensor information, or the object information acquired from the external device to determine the travel route and the travel plan, and may control the driving interface such that the self-driving vehicle 100*b* travels along the determined travel route and travel plan.

The map data may include object identification information about various objects arranged in the space (for example, road) in which the self-driving vehicle 100*b* travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100*b* may perform the operation or travel by controlling the driving interface based on the control/interaction of the user. Here, the self-driving vehicle 100*b* may acquire the intention information of the interaction due to the user's operation or speech utterance, and may determine the response based on the acquired intention information, and may perform the operation.

<AI+XR>

The XR device 100*c*, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100*c* may analyzes three-dimensional point cloud data or image data acquired from various sensors or the external devices, generate position data and attribute data for the three-dimensional points, acquire information about the surrounding space or the real object, and render to output the XR object to be output. For example, the XR device 100*c* may output an XR object including the additional information about the recognized object in correspondence to the recognized object.

The XR device 100*c* may perform the above-described operations by using the learning model composed of at least one artificial neural network. For example, the XR device 100*c* may recognize the real object from the three-dimensional point cloud data or the image data by using the learning model, and may provide information corresponding to the recognized real object. The learning model may be directly learned from the XR device 100*c*, or may be learned from the external device such as the AI server 200.

Here, the XR device 100*c* may perform the operation by generating the result by directly using the learning model, but the sensor information may be transmitted to the external device such as the AI server 200 and the generated result may be received to perform the operation.

<AI+Robot+Self-Driving>

The robot 100*a*, to which the AI technology and the self-driving technology are applied, may be implemented as a guide robot, a carrying robot, a cleaning robot, a wearable robot, an entertainment robot, a pet robot, an unmanned flying robot, or the like.

The robot 100*a*, to which the AI technology and the self-driving technology are applied, may refer to the robot itself having the self-driving function or the robot 100*a* interacting with the self-driving vehicle 100*b*.

The robot 100*a* having the self-driving function may collectively refer to a device that moves for itself along the given route without the user's control or moves for itself by determining the route by itself.

The robot 100*a* and the self-driving vehicle 100*b* having the self-driving function may use a common sensing method so as to determine at least one of the travel route or the travel plan. For example, the robot 100*a* and the self-driving vehicle 100*b* having the self-driving function may determine at least one of the travel route or the travel plan by using the information sensed through the lidar, the radar, and the camera.

The robot 100*a* that interacts with the self-driving vehicle 100*b* exists separately from the self-driving vehicle 100*b* and may perform operations interworking with the self-driving function of the self-driving vehicle 100*b* or interworking with the user who rides on the self-driving vehicle 100*b*.

Here, the robot 100*a* interacting with the self-driving vehicle 100*b* may control or assist the self-driving function of the self-driving vehicle 100*b* by obtaining sensor information on behalf of the self-driving vehicle 100*b* and providing the sensor information to the self-driving vehicle 100*b*, or by obtaining sensor information, generating environment information or object information, and providing the information to the self-driving vehicle 100*b*.

Alternatively, the robot 100*a* interacting with the self-driving vehicle 100*b* may monitor the user boarding the self-driving vehicle 100*b*, or may control the function of the self-driving vehicle 100*b* through the interaction with the user. For example, when it is determined that the driver is in a drowsy state, the robot 100*a* may activate the self-driving function of the self-driving vehicle 100*b* or assist the control of the driving interface of the self-driving vehicle 100*b*. The function of the self-driving vehicle 100*b* controlled by the robot 100*a* may include not only the self-driving function but also the function provided by the navigation system or the audio system provided in the self-driving vehicle 100*b*.

Alternatively, the robot 100*a* that interacts with the self-driving vehicle 100*b* may provide information or assist the function to the self-driving vehicle 100*b* outside the self-driving vehicle 100*b*. For example, the robot 100*a* may provide traffic information including signal information and the like, such as a smart signal, to the self-driving vehicle 100*b*, and automatically connect an electric charger to a charging port by interacting with the self-driving vehicle 100*b* like an automatic electric charger of an electric vehicle.

<AI+Robot+XR>

The robot 100*a*, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100*a*, to which the XR technology is applied, may refer to a robot that is subjected to control/interaction in an XR image. In this case, the robot 100*a* may be separated from the XR device 100*c* and interwork with each other.

When the robot 100*a*, which is subjected to control/interaction in the XR image, may acquire the sensor information from the sensors including the camera, the robot 100*a* or the XR device 100*c* may generate the XR image based on the sensor information, and the XR device 100*c* may output the generated XR image. The robot 100*a* may operate based on the control signal input through the XR device 100*c* or the user's interaction.

For example, the user can confirm the XR image corresponding to the time point of the robot 100*a* interworking remotely through the external device such as the XR device 100*c*, adjust the self-driving travel path of the robot 100*a* through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

Here, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
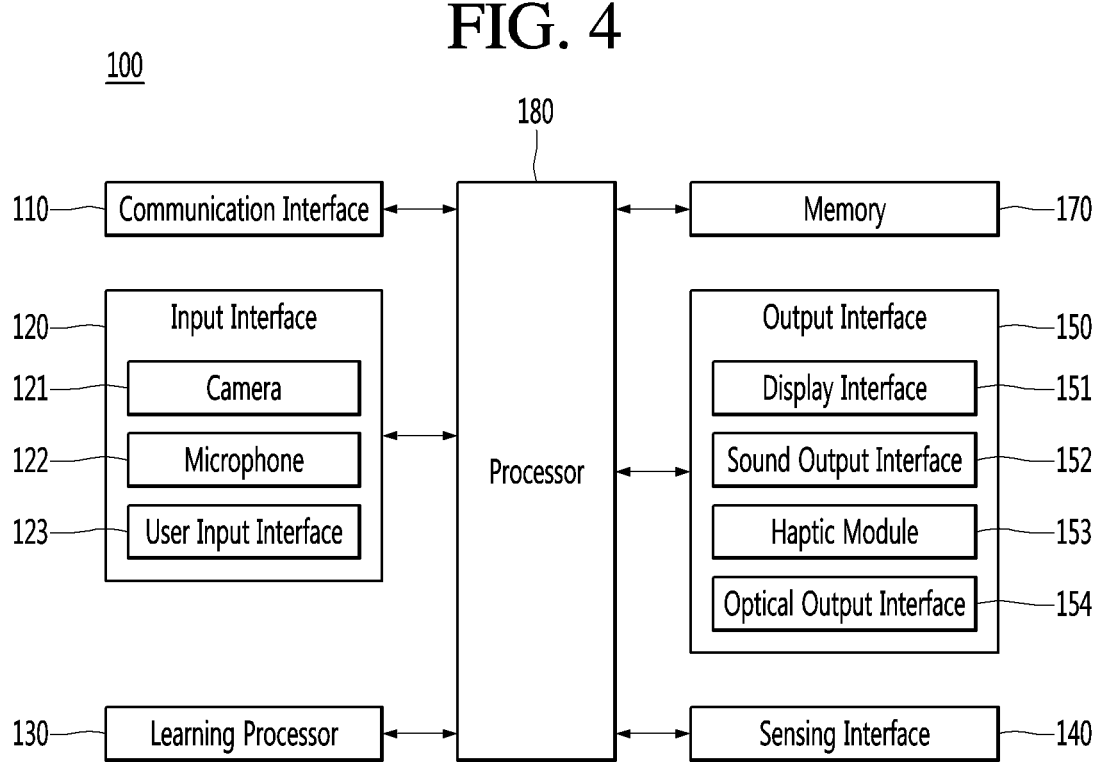
FIG. 4 is a block diagram illustrating an AI apparatus according to an embodiment of the present disclosure.

FIG. 4 is a block diagram illustrating an AI apparatus 100 according to an embodiment of the present disclosure.

The redundant repeat of FIG. 1 will be omitted below.

In the present disclosure, the AI apparatus 100 may include an edge device.

The communication interface 110 may also be referred to as a communicator.

Referring to FIG. 4, the input interface 120 may include a camera 121 for image signal input, a microphone 122 for receiving audio signal input, and a user input interface 123 for receiving information from a user.

Voice data or image data collected by the input interface 120 are analyzed and processed as a user's control command.

Then, the input interface 120 is used for inputting image information (or signal), audio information (or signal), data, or information inputted from a user and the AI apparatus 100 may include at least one camera 121 in order for inputting image information.

The camera 121 processes image frames such as a still image or a video obtained by an image sensor in a video call mode or a capturing mode. The processed image frame may be displayed on the display interface 151 or stored in the memory 170.

The microphone 122 processes external sound signals as electrical voice data. The processed voice data may be utilized variously according to a function (or an application program being executed) being performed in the AI apparatus 100. Moreover, various noise canceling algorithms for removing noise occurring during the reception of external sound signals may be implemented in the microphone 122.

The user input interface 123 is to receive information from a user and when information is inputted through the user input interface 123, the processor 180 may control an operation of the AI apparatus 100 to correspond to the inputted information.

The user input interface 123 may include a mechanical input means (or a mechanical key, for example, a button, a dome switch, a jog wheel, and a jog switch at the front, back or side of the AI apparatus 100) and a touch type input means. As one example, a touch type input means may include a virtual key, a soft key, or a visual key, which is displayed on a touch screen through software processing or may include a touch key disposed at a portion other than the touch screen.

The sensing interface 140 may also be referred to as a sensor interface.

The output interface 150 may include at least one of a display interface 151, a sound output module 152, a haptic module 153, or an optical output module 154.

The display interface 151 may display (output) information processed in the AI apparatus 100. For example, the display interface 151 may display execution screen information of an application program running on the AI apparatus 100 or user interface (UI) and graphic user interface (GUI) information according to such execution screen information.

The display interface 151 may be formed with a mutual layer structure with a touch sensor or formed integrally, so that a touch screen may be implemented. Such a touch screen may serve as the user input interface 123 providing an input interface between the AI apparatus 100 and a user, and an output interface between the AI apparatus 100 and a user at the same time.

The sound output module 152 may output audio data received from the wireless communication interface 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the AI apparatus 100. An example of an event occurring in the AI apparatus 100 includes message reception, call signal reception, missed calls, alarm, schedule notification, e-mail reception, and information reception through an application.

Hereinafter, in the present disclosure, "corpus of language" may be used interchangeably with data in which language data or second language data is preprocessed.

Figure 5:
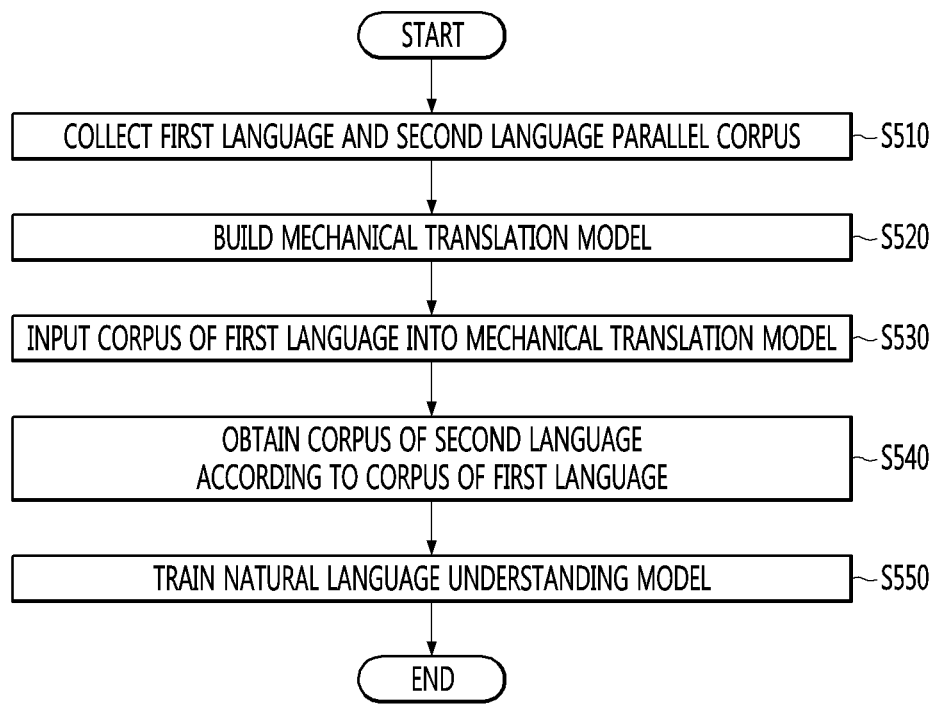
FIG. 5 is a flowchart of the present disclosure.

FIG. 5 is a flowchart of the present disclosure.

S510 and S520 of FIG. 5 are processes for building a machine translation model.

Referring to FIG. 5, the artificial intelligence apparatus 100 according to the present disclosure may collect data for building a machine translation model (S510).

In more detail, the processor 180 may collect first language data and second language data corresponding to the first language. The second language data corresponding to the first language data may refer to a parallel corpus built as corpus pairs. The parallel corpus may be built by a translator or may use an open database.

In this case, the first language and the second language may be different languages from each other, and the second language data corresponding to the first language data may have the same meaning.

After the parallel corpus of the first language data and the second language data is collected, the processor 180 may build a machine translation model using the collected corpus (S520). Hereinafter, "corpus of language data" may be used interchangeably with "language corpus".

In this case, the corpus may refer to a text corpus. The text corpus can include an extensive database obtained by collecting words spoken or texts published by real people. In particular, a text corpus obtained by collecting translated documents of two or more languages may refer to a parallel corpus.

In this case, the machine translation model may include a model using sequence-to-sequence. The sequence-to-sequence may consist of an encoder and a decoder. The encoder receives all the words in the input sentence sequentially and finally compresses all the word information into a vector. The compressed vector may be referred to as a context vector.

If the information of the input sentence is all compressed into one context vector, the encoder may transmit the context vector to the decoder. The decoder may include a model that receives the context vector and sequentially outputs the translated words one by one.

In addition, the machine translation model may include a rule-based machine translation (RBMT) model, a statistical machine translation (SMT) model, and a neural machine translation (NMT) model.

In this case, the machine translation model based on an artificial neural network may perform translation by converting an input sentence into a sentence vector form and generating a sentence of an output language based on the input sentence.

According to the present disclosure, the processor 180 may input a corpus of the first language into the machine translation model by using the built machine translation model (S530). In this case, the corpus of the first language input into the machine translation model may be first language data or data preprocessed with the first language data.

If the corpus of the first language is input into the machine translation model, the processor 180 may obtain a corpus of the second language as an output value of the machine translation model (S540). In this case, the corpus of the second language may be second language data or data preprocessed with the second language data.

The processor 180 may obtain a corpus of the second language corresponding to the corpus of the first language using the machine translation model, and learn the natural language understanding model using the obtained corpus (S550). In detail, if the corpus of the second language is input, the processor 180 may learn the natural language understanding model to output a command corresponding to the corpus of the first language.

The natural language understanding model will be described in detail with reference to FIG. 6.

Figure 6:
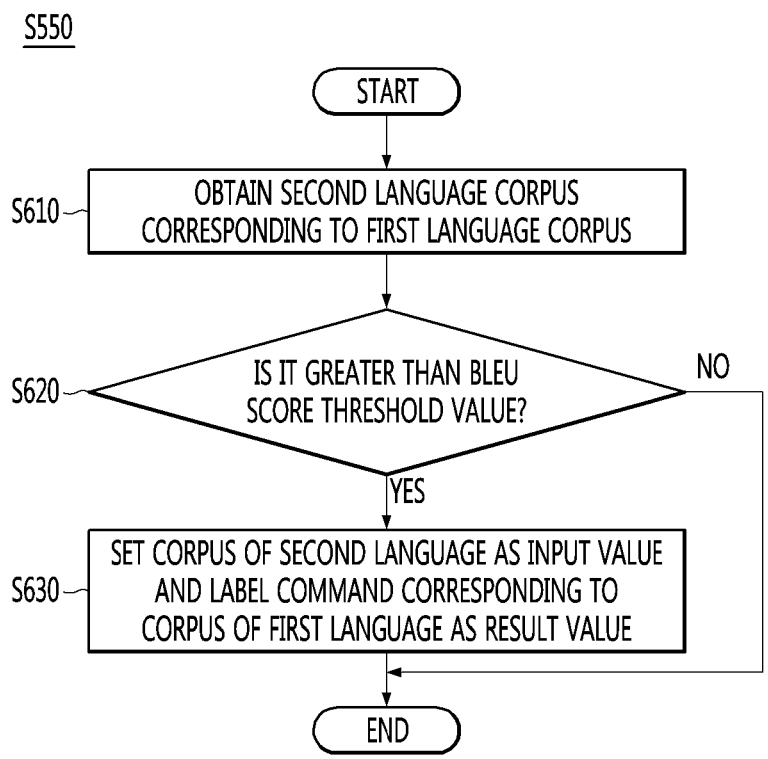
FIG. 6 is a flowchart of the present disclosure.

FIG. 6 is a flowchart illustrating a learning process of a natural language understanding model.

Referring to FIG. 6, the processor 180 may obtain a corpus of a second language corresponding to a corpus of a first language using a machine translation model. The processor 180 may learn the natural language understanding model using the obtained corpus of the second language. The corpus of the language may be used interchangeably with the corpus of language data.

Meanwhile, if the performance of the built machine translation model is low, the processor 180 obtains a low quality corpus of the second language. If a natural language understanding model is learned using a corpus of a second language of low quality, the result output by the natural language understanding model may also be different from a command intended by the user.

Referring to a case where a natural language understanding model learned using the low quality corpus of a language is used, second language data is received through the input unit 120 of the artificial intelligence apparatus 100, and even if the processor 180 inputs the second language data or the corpus of the second language into the natural language understanding model, the natural language understanding model may not correctly output a command corresponding to the corpus of the second language.

In order to prevent such a case, the processor 180 of the artificial intelligence apparatus 100 evaluates the machine translation model and learns a natural language understanding model using the verified machine translation model to be capable of accurately deriving a command corresponding to the received language data.

Hereinafter, a process of evaluating the natural language understanding model will be described.

If the processor 180 according to the present disclosure obtains the corpus of the second language corresponding to the corpus of the first language, the processor 180 may evaluate the machine translation model using the obtained corpus.

The evaluation of the machine translation model may be performed through an evaluation model.

The evaluation model may evaluate a machine translation model using a Bilingual Evaluation Understudy (BLEU) score.

In this case, the BLEU may include an evaluation method for measuring the performance of the translation by comparing how similar the machine translation result and the human-direct translation result. Specifically, the BLEU may be performed by measuring the similarity between the corpus of the translated second language and the correct answer group in the form of N-gram precision.

Specifically, the BLEU may include an algorithm consisting of a method of measuring how many N-grams of the machine translation results match within a correct answer group and taking a geometric mean using the N-gram precision.

In this case, the correct answer group may mean second language data having the same meaning as the first language data as second language data in which the first language data is well translated. In addition, the language data may also include a corpus.

The processor 180 may calculate a BLUE score by comparing the corpus of the second language obtained from the machine translation model with the correct answer group and learn the natural language understanding model if the BLEU score is greater than a threshold value (S620).

The processor 180 according to the present disclosure may set a corpus of the second language as an input value and set a command corresponding to the corpus of the first language as a result value in order to learn the natural language understanding model (S630). In this case, according to the performance of the translation model, the command corresponding to the corpus of the first language may be a command having the same meaning as the command corresponding to the corpus of the second language.

In detail, since the processor 180 learns the natural language understanding model if the BLEU score is greater than the threshold value, the higher the threshold value, the higher the performance of the machine translation model. Using the verified machine translation model, the commands corresponding to the corpus of the first language may have the same meaning as the commands corresponding to the corpus of the second language.

Through the above process, assuming that a user fluent in the first language exists and a machine translation model is built that translates the first language data into the second language data if the first language data is input, even if the user fluent in the first language is not fluent in a second language, the user can enable the natural language understanding model of the second language to be learned by obtaining the second language corpus through the machine translation model, setting the obtained second language corpus as an input value, and labeling the command corresponding to the corpus of the first language as a result value.

In addition, the input value of the natural language understanding model of the second language may be second language data output by the machine translation model. The result value of the natural language understanding model of the second language may be set as a command corresponding to the first language data. Therefore, a user fluent in the first language can learn the natural language understanding model of the second language. In this case, if the user fluent in the second language uses the built natural language understanding model, the natural language understanding model of the second language outputs a command according to the second language data input by the user fluent in the second language, and artificial intelligence apparatus 100 may perform an operation according to the command.

According to another embodiment of the present disclosure, the artificial intelligence apparatus 100 may include a memory 170 that stores a plurality of commands respectively corresponding to a plurality of corpora of the first language.

For example, the memory 170 of the artificial intelligence apparatus 100 can store a mapping table that stores 1) "command to control TV to be turned on" and 2) "command to control the light to be turned on" as a plurality of commands corresponding to 1) "turn on TV", 2) "turn on light", which are a plurality of corpora made in English.

If the second corpus of the second language is obtained as the first corpus of the first language of the plurality of corpora is input into the machine translation model, the processor 180 of the artificial intelligence apparatus 100 may obtain a command corresponding to the first corpus of the plurality of commands from the memory, set the second corpus as an input value, and label a command corresponding to the first corpus as a result value to learn the natural language understanding model.

For example, if 1) "TV 켜줘" which is a corpus made in Korean is obtained as 1) "turn on TV" of the plurality of corpora made in English is input into the machine translation model, the processor 180 of the artificial intelligence apparatus 100 can obtain 1) "command to control TV to be turned on", which is a command which corresponds to 1) "turn on TV" of the plurality of commands, from the memory 170.

In addition, the processor 180 sets 1) "TV 켜줘" which is the Korean language corpus as an input value of the natural language understanding model, and as a result labels 1) "command to control the TV to be turned on" to learn the natural language understanding model. Through the above method, a user fluent in English may learn a natural language understanding model that outputs a command corresponding to the input data if Korean is input, even if the user is not fluent in Korean.

Figure 7:
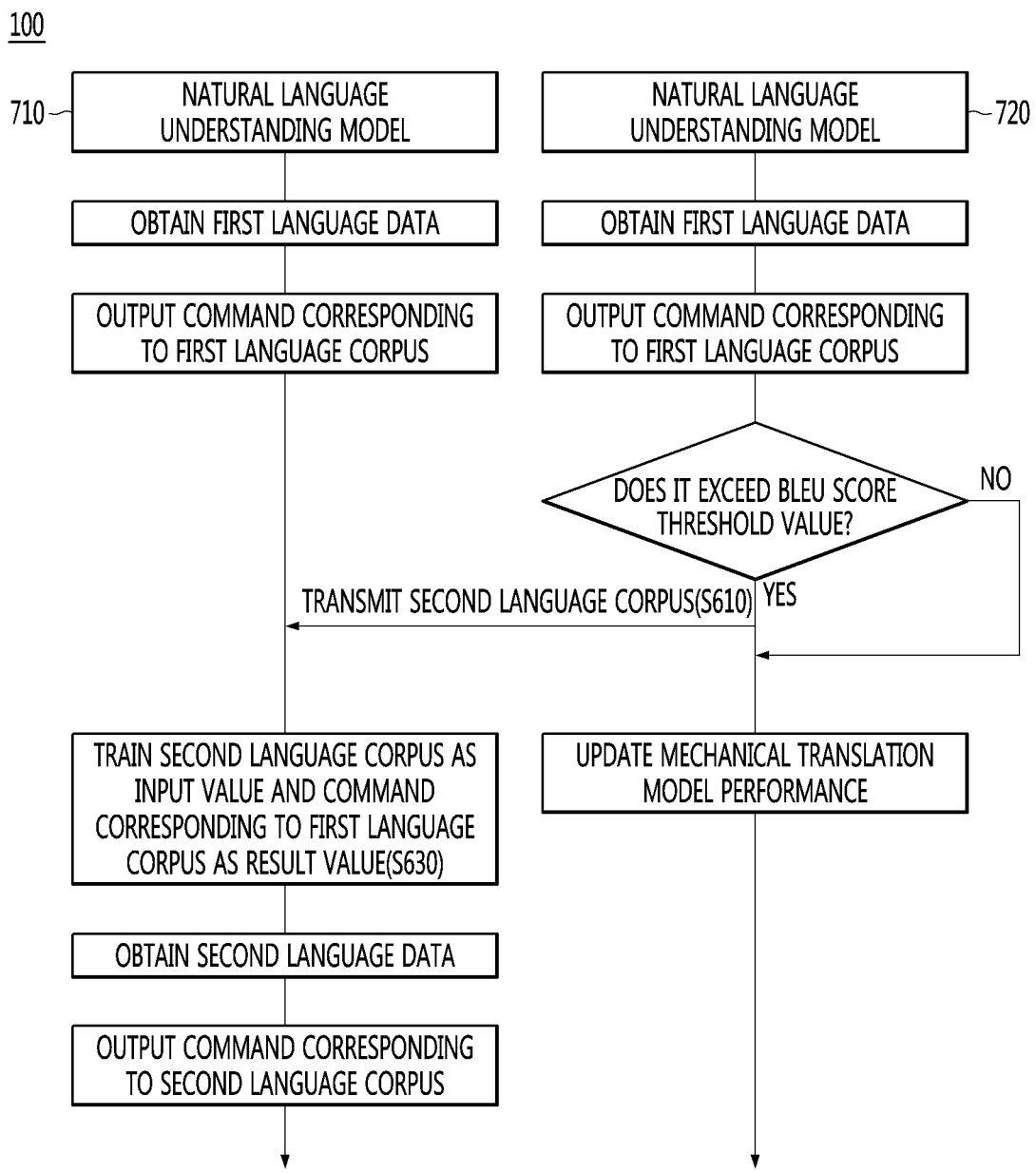
FIG. 7 is a flowchart of the present disclosure.

FIG. 7 is a diagram illustrating a method for learning a natural language understanding model according to an embodiment of the present disclosure.

FIG. 7 illustrates another example according to the present disclosure. Referring to FIG. 7, the artificial intelligence apparatus 100 may receive first language data and obtain a corpus of the first language from the received first language data through a preprocessing process. Thereafter, the corpus of the first language may be input to the natural language understanding model 710 to obtain a command corresponding to the corpus of the first language.

In addition, the artificial intelligence apparatus 100 inputs the corpus of the first language into the machine translation model 720 to obtain a corpus of the second language, sets the corpus of the second language obtained from the machine translation model 720 as an input value, and automatically label a command corresponding to the corpus of the first language as a result value to learn the natural language understanding model 710.

In detail, the artificial intelligence apparatus 100 may receive first language data through the input unit 120. In this case, the input unit 120 may include a microphone for receiving voice data. In addition, the input unit 120 may include a user input unit for obtaining information from the user.

In addition, the processor 180 of the artificial intelligence apparatus 100 extracts characteristic data from the received first language data through a preprocessing process, inputs the corpus of the first language into the natural language understanding model 710 to obtain a command corresponding to the corpus of the first language.

The processor 180 of the artificial intelligence apparatus 100 may input a corpus of the first language into the machine translation model 720 to obtain a corpus of a second language corresponding to the corpus of the first language.

For example, the artificial intelligence apparatus 100 may receive 1) 'turn on the TV' which is data made in English through the input unit 120.

In addition, the processor 180 of the artificial intelligence apparatus 100 extracts characteristic data from the received 1) "turn on TV" through a preprocessing process, and inputs a corpus made in English into the natural language understanding model 710 to obtain 1) "command to control TV to be turned on" which is a command corresponding to the corpus made in English.

In addition, the processor 180 of the artificial intelligence apparatus 100 inputs 1) "turn on TV" into the machine translation model 720 to obtain 1) "TV 켜줘", which is a Korean corpus corresponding to a corpus made in English.

Hereinafter, a process of learning a natural language understanding model using the machine translation model of FIG. 7 will be described.

The first language data may be received through the input unit 120 of the artificial intelligence apparatus 100 according to the present disclosure. The processor 180 of the artificial intelligence apparatus 100 may input the received first language data into the natural language understanding model 710 and the machine translation model 720.

The language data may include a corpus of languages that have undergone the preprocessing process of data received from a user.

If the natural language understanding model 710 receives the corpus of the first language, the natural language understanding model 710 may output a command corresponding to the corpus of the first language. In this case, the command corresponding to the first language data may include a control signal for controlling the terminal or the device on which the artificial intelligence apparatus is mounted. However, it is not limited thereto.

If the machine translation model 720 receives the corpus of the first language, the machine translation model 720 may obtain a corpus of the second language according to the corpus of the first language. The processor 180 of the artificial intelligence apparatus 100 may measure the BLEU score of the corpus of the obtained second language to verify the performance of the machine translation model 720.

If the processor 180 compares the obtained corpus of the second language with the correct answer group and the BLEU score exceeds a preset threshold value, the processor 180 can transmit the corpus of the second language for learning the natural language understanding model 710 to the natural language understanding model 710 (S610).

The processor 180 uses the transmitted corpus of the second language as an input value of the natural language understanding model 710 and labels a command corresponding to the corpus of the first language obtained from the natural language understanding model 710 as a result value to learn the natural language understanding model 710.

Alternatively, the processor 180 may collect a command corresponding to the first language data by using the natural language understanding model 710 whenever the first language data is received by the input unit 120. The processor can collect the second language data according to the first language data using the machine translation model 720, and build a database for learning the natural language understanding model 710 using the collected commands and language data. The built database may be stored in the memory 170 of the artificial intelligence apparatus 100.

The processor 180 may learn the natural language understanding model 710 using the built database.

Unlike the method in which the user manually labels the result value corresponding to the existing input value, the artificial intelligence apparatus 100 according to the present disclosure obtains the result value of the natural language understanding model to be labeled through the pre-built natural language understanding model and obtains an input value through the machine translation model, and thus since the natural language understanding model according to the second language can be built only if the input unit 120 of the artificial intelligence apparatus 100 obtains the first language data through utterance or other input, the artificial intelligence apparatus 100 learns the natural language understanding model in a more convenient and economical way than the existing method.

After the natural language understanding model is learned, the processor 180 of the artificial intelligence apparatus 100 according to the present disclosure can receive the second language data and input the received second language data into the natural language understanding model to obtain a command corresponding the received second language data.

In this case, the command corresponding to the second language data may be a corpus of the first language labeled as a result corresponding to the corpus of the second language in the learning process. In addition, the corpus of the first language may have the same meaning as the corpus of the second language derived through the machine translation model.

The processor 180 may control the artificial intelligence apparatus 100 through the obtained command. In addition, if the BLEU score of the corpus of the second language corresponding to the corpus of the first language obtained from the machine translation model does not exceed the threshold value, the processor 180 of the artificial intelligence apparatus 100 according to the present disclosure can perform additional learning to improve the performance of the mechanical translation model.

The additional learning may include a process of collecting a parallel corpus of additional first language data and second language data to learn a machine translation model.

The natural language understanding model according to the present disclosure may include an existing rule-based algorithm. In addition, the natural language understanding model also includes an artificial neural network and can be learned using a machine learning algorithm or a deep learning algorithm.

The input value of the learning data used to the learning of the natural language understanding model 710 may be information about a corpus of a second language, which is a result of the corpus of the first language being input to the machine translation model. For example, the information about the corpus of the second language may include data in which the corpus of the second language data or the second language data has undergone the preprocessing process (for example, tokenization, word embedding, or the like). Meanwhile, The present disclosure is not limited to the above examples.

In addition, a result value of the learning data used for learning the natural language understanding model 710 can use a command corresponding to the corpus of the first language as label information. In this case, the command corresponding to the corpus of the first language may mean a command corresponding to the first language data derived through the natural language understanding model 710 if the first language data is received to the artificial intelligence apparatus 100.

If the corpus of the second language is given, the natural language understanding model 710 may be learned to output a command corresponding to the corpus of the first language included in the learning data corresponding to the corpus of the second language.

Although the natural language understanding model 710 may be learned from the processor 180 or the learning processor 130 of the artificial intelligence apparatus 100 and stored in the memory 170 of the artificial intelligence apparatus 100, the natural language understanding model 710 may be learned at the processor 260 or the learning processor 240 of the artificial intelligence server 200 and stored in the memory 170 of the artificial intelligence apparatus 100. Alternatively, the natural language understanding model 710 may be learned at the processor 260 or the learning processor 240 of the artificial intelligence server 200 and stored in the memory 230 of the artificial intelligence server 200.

If the natural language understanding model 710 is stored in the memory 170 of the artificial intelligence apparatus 100, the processor 180 of the artificial intelligence apparatus 100 may use the natural language understanding model 710 stored in the memory 170 to determine a command corresponding to the corpus of the first language.

Alternatively, if the natural language understanding model 710 is not stored in the memory 170 of the artificial intelligence apparatus 100, the processor 180 of the artificial intelligence apparatus 100 may receive the natural language understanding model 710 from the artificial intelligence server 200 through the communication unit 110 to be stored in the memory 170 and determine a command corresponding to the corpus of the first language using the natural language understanding model 710 stored in the memory 170.

Alternatively, if the natural language understanding model 710 is not stored in the memory 170 of the artificial intelligence apparatus 100, the processor 180 of the artificial intelligence apparatus 100 may transmit the corpus of the second language to the artificial intelligence server 200 through the communication unit 110, the processor 260 of the artificial intelligence server 200 uses the natural language understanding model 710 stored in the memory 240 to determine a command corresponding a corpus of the first language, and the processor 180 of the artificial intelligence apparatus 100 may receive a command corresponding to the corpus of the first language determined from the artificial intelligence server 200 through the communication unit 110.

By using the learned natural language understanding model, the processor 180 of the artificial intelligence apparatus 100 according to the present disclosure may extract the corpus of the second language from the second language data if second language data is received and input the corpus of the extracted second language into the natural language understanding model to perform an operation according to a command output by the natural language understanding model. Alternatively, the processor 180 may control the device on which the artificial intelligence apparatus 100 is mounted so as to perform an operation according to the command.

Hereinafter, the configuration of a natural language processing model will be simply described with reference to FIG. 8.

According to an embodiment of the present disclosure, the natural language understanding model 820 may include a characteristic extraction unit 821, a candidate acoustic model 822, and a language model 823 as components for performing voice recognition.

The characteristic extraction unit 821 extracts characteristic information about the input voice signal. If the characteristic extraction unit 821 receives the voice signal, the characteristic extraction unit 821 may detect only the voice part spoken by the actual speaker and extract information capable of indicating the characteristic of the voice signal. The information capable of indicating the characteristics of the voice signal may include, for example, information that may indicate a shape of a mouth or a position of a tongue according to a waveform to which the voice signal belongs.

The acoustic model 822 may detect at least one candidate pronunciation variants that may match the voice signal using the characteristic information of the extracted voice signal. In addition, the acoustic model 822 may be generated from a large amount of voice data through a statistical method, be generated from an unspecified number of utterance data, or may be generated from utterance data collected from the specified speaker. Therefore, the acoustic model may be individually applied to voice recognition according to the speaker.

The language model 823 may obtain appearance probability information of each detected candidate pronunciation variant. In addition, the natural language understanding model may finally determine the voice recognized word by selecting the voice recognized final language based on the appearance probability information of each candidate pronunciation variant.

For example, if there is a user's utterance to perform a specific command, a "specific command" is output through the natural language understanding model, and the artificial intelligence apparatus can perform the specific command or control another device to perform the specific command.

Hereinafter, the scenario of FIG. 8 will be described.

Figure 8:
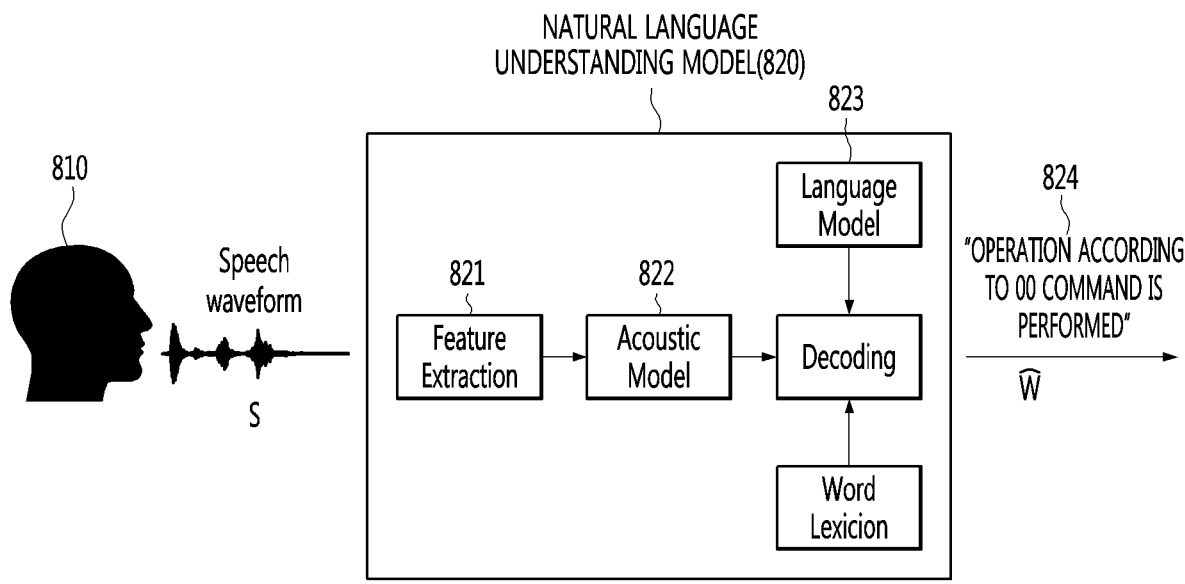
FIG. 8 is a scenario example of the present disclosure.

FIG. 8 illustrates a usage scenario of the natural language understanding model in the present disclosure.

Referring to FIG. 8, the user 810 fluent in the second language may utter a voice signal made in the second language. The input unit 120 of the artificial intelligence apparatus 100 may obtain the voice signal, and the processor 180 may input the received voice signal into a natural language understanding model. The processor may obtain a voice command corresponding to the voice signal made in the second language output by the natural language understanding model and perform an operation corresponding to the voice command.

Figure 9:
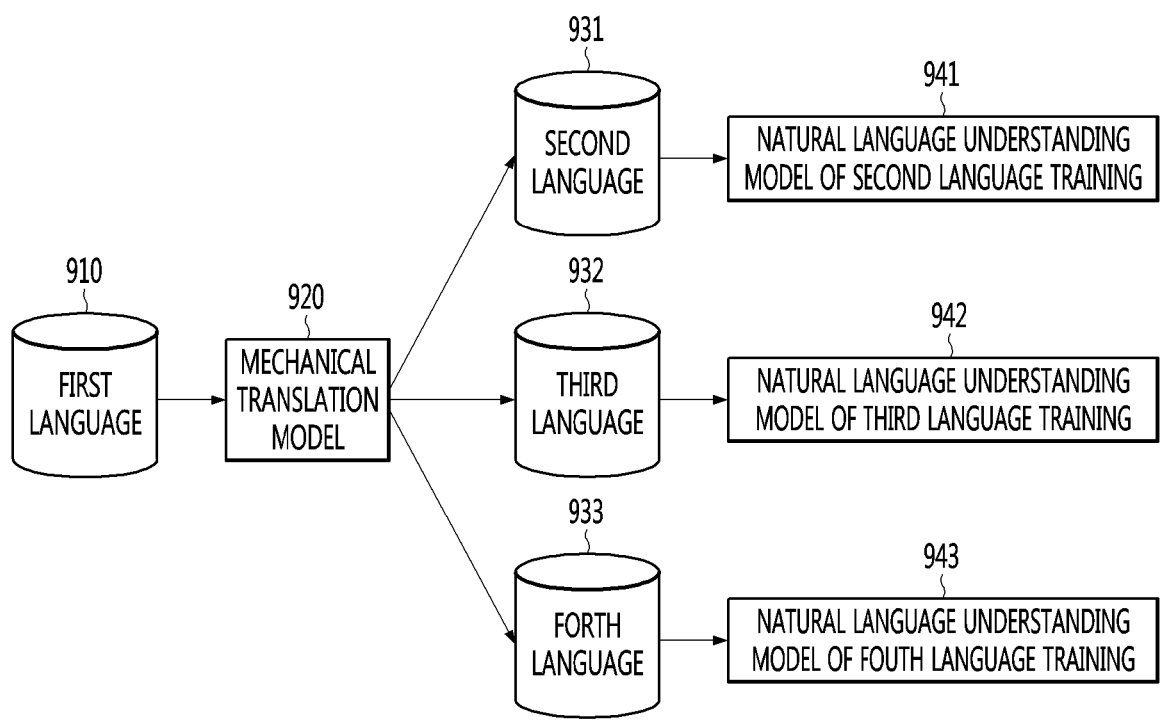
FIG. 9 is an operation example of the present disclosure.

FIG. 9 is an operation example of the present disclosure.

FIG. 9 illustrates a process in which a user fluent in a first language learns a natural language understanding model according to the second language, the third language, and the fourth language using the machine translation model. In FIG. 9, a natural language understanding model is separately built for each language, but the natural language understanding model may be built as an integrated model but is not limited to FIG. 9.

If a user fluent in the first language inputs language data to be learned, the processor 180 of the artificial intelligence apparatus 100 may input the received corpus of the first language into the machine translation model. The machine translation model may generate the corpus of the second language, the corpus of the third language, and the corpus of the fourth language, corresponding to the corpus of the first language.

In this case, the first language, the second language, the third language, and the fourth language may be different languages from each other, and the corpus of the second language, the corpus of the third language, and the corpus of the fourth language, which are translated through the machine translation model may include a corpus having the same meaning as the corpus of the first language.

After the processor 180 obtains the corpus of the second language, the corpus of the third language, and the corpus of the fourth language which obtain by translating the corpus of the first language, the processor 180 sets the corpus of the second language as an input value and, as the result value, labels the command according to the corpus of the first language to learn the natural language understanding model of the second language. In addition, the corpus of the third language may be set as an input value and labels the command according to the corpus of the first language as a result value, to learn the natural language understanding model of the third language. In addition, the processor 180 sets the corpus of the fourth language as an input value and labels the command according to the corpus of the first language as a result value to learn the natural language understanding model of the fourth language.

Figure 10:
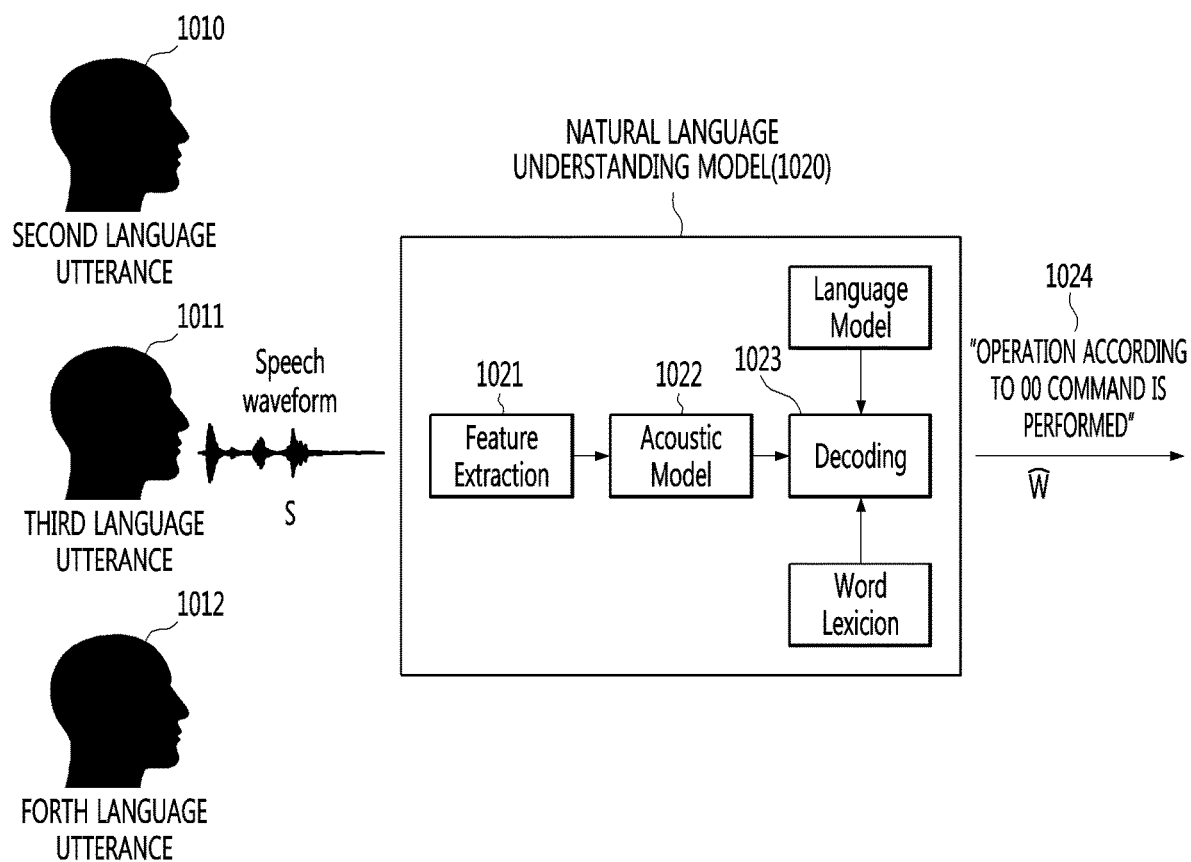
FIG. 10 is a scenario example of the present disclosure.

FIG. 10 illustrates a scenario which uses a natural language understanding model learned in FIG. 9.

Referring to the scenario of FIG. 10, users 1010, 1011, and 1012 who use different languages respectively may utter languages by which the users are fluently uttered. The input unit 120 of the artificial intelligence apparatus 100 may obtain second language data according to a second language utterance, third language data according to a third language utterance, and fourth language data according to a fourth language utterance, of the users. The processor 180 of the artificial intelligence apparatus 100 may input each corpus of language data obtained in the input unit 120 into the natural language understanding model 1020.

In this case, the natural language understanding model of FIG. 10 may include a natural language understanding model learned so as to perform commands corresponding to the second language, the third language, and the fourth language in FIG. 9. The natural language understanding model may output a command corresponding to the corpus of the second language, a command corresponding to the corpus of the third language, and a command corresponding to the corpus of the fourth language, respectively.

In this case, the command corresponding to the corpus of each language may include the same command as the command corresponding to the corpus of the first language labeled as a result value if the corpus of each language is input into the natural language understanding model in the learning process.

The artificial intelligence apparatus 100 may perform a command corresponding to each result output from the natural language understanding model, and control another device to perform the command.

Meanwhile, a method for operating an artificial intelligence apparatus according to the present disclosure may include inputting a corpus of a first language into a machine translation model to obtain the corpus of the second language, and if the corpus of the second language is input, learning the natural language understanding model to output a command corresponding to the corpus of the first language.

In addition, the machine translation model may be learned so as to output a corpus of the second language having the same meaning as a result value if the corpus of the first language is input as an input value, and the first language and the second language may be different languages from each other.

In addition, the method for operating an artificial intelligence apparatus may further include comparing a corpus of the second language with a correct answer group to calculate a Bleu score, and the learning a natural language understanding model may include learning the natural language understanding model using the corpus of the second language, if the Bleu score is greater than the threshold value.

In addition, the command corresponding to the corpus of the first language means a command having the same meaning as the command corresponding to the corpus of the second language, and the natural language understanding model may label the corpus of the second language the command corresponding to the corpus of the first language to be learned.

In addition, the method for operating an artificial intelligence apparatus may include storing a plurality of commands corresponding to each of a plurality of corpora of the first language, and may further include, if the second corpus of the second language is obtained as the first corpus of the first language of the plurality of corpus is input into the machine translation model, obtaining a command corresponding to the first corpus of the plurality of commands, setting the second corpus as an input value and labeling a command corresponding to the first corpus as a result value to learn the natural language understanding model.

In addition, the method for operating an artificial intelligence apparatus may further include obtaining second language data, and extracting the corpus of the second language from the second language data and inputting the corpus of the extracted second language into the natural language understanding model to perform an operation according to a command output by the natural language understanding model.

In addition, the method of operating an artificial intelligence apparatus may further include inputting the corpus of the first language into the machine translation model to obtain a corpus of a third language, and if the corpus of the third language is input, learning the natural language understanding model to output a command corresponding to the corpus of the first language, in which the third language may be a language different from the second language.

In addition, the command corresponding to the corpus of the first language may mean a command having the same meaning as the command corresponding to the corpus of the third language, and the natural language understanding model may labels the corpus of the third language the command corresponding to the corpus of the first language to be learned.

In addition, the method for operating an artificial intelligence apparatus may further include obtaining third language data and extracting the corpus of the third language from the third language data and inputting the corpus of the extracted third language into the natural language understanding model to perform an operation according to a command output by the natural language understanding model.

The present disclosure enables a user fluent in a first language to learn a natural language understanding model of a second language that is not fluent by using a machine translation model.

Flowcharts according to the present disclosure may be performed regardless of the order or concurrently. That is, they are not conslearned in time-series order.

Other implementations are within the scope of the following claims

The present disclosure can be made in software, firmware or a combination of software and firmware.

According to an embodiment of the present disclosure, the above-described method may be implemented as a processor-readable code in a medium where a program is recorded. Examples of a processor-readable medium may include hard disk drive (HDD), solid state drive (SSD), silicon disk drive (SDD), read-only memory (ROM), random access memory (RAM), CD-ROM, a magnetic tape, a floppy disk, and an optical data storage device.

What is claimed is:

1. An artificial intelligence apparatus comprising:
a memory; and
one or more processors configured to:
input a corpus of a first language into a machine translation model to obtain a corpus of a second language, and
based on the corpus of the second language being input, train a natural language understanding model to label the corpus of the second language with a command corresponding to the corpus of the first language, the command corresponding to the corpus of the first language having a same meaning as a command corresponding to the corpus of the second language, and to output the labeled command corresponding to the corpus of the first language,
wherein the memory stores a plurality of commands respectively corresponding to a plurality of corpora of the first language,
wherein the machine translation model is trained so as to output the corpus of the second language as a result value if the corpus of the first language is input as an input value,
wherein the corpus of the second language has the same meaning as the corpus of the first language, wherein the first language and the second language are different languages from each other, and wherein the one or more processors are configured to:
compare the corpus of the second language with a correct answer group to calculate a Bilingual Evaluation Understudy (BLEU) score,
train the natural language understanding model using the corpus of the second language if the BLEU score is greater than a threshold value,
obtain the command corresponding to the first corpus among the plurality of commands from the memory based on a second corpus of the second language being obtained as a first corpus of the first language among the plurality of corpora input into the machine translation model, and
set the second corpus as an input value and label the command corresponding to the first corpus as a result value to train the natural language understanding model.

2. The artificial intelligence apparatus of claim 1, further comprising:
an input interface for obtaining second language data,
wherein the one or more processors are configured to:
extract the corpus of the second language from the second language data and input the extracted corpus of the second language into the natural language understanding model to perform an operation according to a command output by the natural language understanding model,
wherein the command output by the natural language understanding model is a command corresponding to the corpus of the first language that is labeled with the extracted corpus of the second language to have the same meaning as the command corresponding to the extracted corpus of the second language.

3. The artificial intelligence apparatus of claim 1, further comprising:
Wherein one or more processors are configured to:
input the corpus of the first language into the machine translation model to obtain a corpus of a third language, and
based on the corpus of the third language being input, train the natural language understanding model to label the corpus of the third language with a command corresponding to the corpus of the first language, the command corresponding to the corpus of the first language having a same meaning as a command corresponding to the corpus of the third language, and to output the labeled command corresponding to the corpus of the first language, and
wherein the third language is a language different from the second language.

4. The artificial intelligence apparatus of claim 3,
wherein the input interface obtains third language data,
wherein the one or more processors are configured to:
extract the corpus of the third language from the third language data and input the extracted corpus of the third language into the natural language understanding model to perform an operation according to a command output by the natural language understanding model,
wherein the command output by the natural language understanding model is a command corresponding to the corpus of the first language that is labeled with the extracted corpus of the third language to have the same meaning as the command corresponding to the extracted corpus of the third language.

5. A method for operating an artificial intelligence apparatus comprising:
inputting a corpus of a first language into a machine translation model to obtain a corpus of a second language; and
based on the corpus of the second language being input, training a natural language understanding model to label the corpus of the second language with a command corresponding to the corpus of the first language, the command corresponding to the corpus of the first language having a same meaning as a command corresponding to the corpus of the second language, and to output the labeled a command corresponding to the corpus of the first language,
wherein a plurality of commands is stored each corresponding to a plurality of corpora of the first language,
wherein the machine translation model is trained so as to output the corpus of the second language as a result value if the corpus of the first language is input as an input value,
wherein the corpus of the second language has the same meaning as the corpus of the first language, and
wherein the first language and the second language are different languages from each other;
comparing the corpus of the second language with a correct answer group to calculate a BLEU score,
wherein the training the natural language understanding model includes training the natural language understanding model using the corpus of the second language based on the BLEU score being greater than a threshold value;
obtaining the command corresponding to the first corpus among the plurality of commands based on the second corpus of the second language being obtained as the first corpus of the first language among the plurality of corpora input into the machine translation model; and
setting the second corpus as an input value and labeling the command corresponding to the first corpus as a result value to train the natural language understanding model.

6. The method for operating an artificial intelligence apparatus of claim 5, further comprising:
obtaining second language data; and
performing an operation according to a command output by the natural language understanding model by extracting the corpus of the second language from the second language data and inputting the extracted corpus of the second language into the natural language understanding model,
wherein the command output by the natural language understanding model is a command corresponding to the corpus of the first language that is labeled with the extracted corpus of the second language to have the same meaning as the command corresponding to the extracted corpus of the second language.

7. The method for operating an artificial intelligence apparatus of claim 5, further comprising:
inputting the corpus of the first language into the machine translation model to obtain a corpus of a third language; and
based on the corpus of the third language being input, training the natural language understanding model to label the corpus of the third language with a command corresponding to the corpus of the first language, the command corresponding to the corpus of the first language having a same meaning as a command corresponding to the corpus of the third language, and to output the labeled command corresponding to the corpus of the first language, wherein the third language is a language different from the second language.

8. The method for operating an artificial intelligence apparatus of claim 7, further comprising:

obtaining third language data; and performing an operation according to a command output by the natural language understanding model by extracting the corpus of the third language from the third language data and inputting the extracted corpus of the third language into the natural language understanding model, wherein the command output by the natural language understanding model is a command corresponding to the corpus of the first language that is labeled with the extracted corpus of the third language to have the same meaning as the command corresponding to the extracted corpus of the third language.

* * * * *